US012659238B2

(12) United States Patent
Kodialam et al.

(10) Patent No.: US 12,659,238 B2
(45) Date of Patent: Jun. 16, 2026

(54) OPAQUE ROUTING ON OVERLAY NETWORKS: A STRUCTURED NEURAL NET BASED APPROACH

(71) Applicant: Nokia Solutions and Networks Oy, Espoo (FI)

(72) Inventors: Muralidharan Kodialam, Austin, TX (US); TV Lakshman, Morganville, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 267 days.

(21) Appl. No.: 18/466,195

(22) Filed: Sep. 13, 2023

(65) Prior Publication Data

US 2025/0088429 A1 Mar. 13, 2025

(51) Int. Cl.
*H04L 41/16* (2022.01)
*H04L 41/147* (2022.01)

(52) U.S. Cl.
CPC ............ *H04L 41/16* (2013.01); *H04L 41/147* (2013.01)

(58) Field of Classification Search
CPC .............................. H04L 41/16; H04L 41/147
See application file for complete search history.

(56) References Cited

U.S. PATENT DOCUMENTS

2016/0294699 A1* 10/2016 Kodialam ............. H04L 47/125
2021/0297928 A1* 9/2021 Chowta ................. H04W 40/32

2022/0014451 A1* 1/2022 Naik ....................... H04L 45/02
2022/0187367 A1* 6/2022 Yi .................. G01R 31/318328
2023/0216795 A1* 7/2023 Martin .................. H04L 47/125
709/226

FOREIGN PATENT DOCUMENTS

CN 113435567 B 7/2023

OTHER PUBLICATIONS

Extended European Search Report issued in European Application No. 24198924.3-1206 mailed Jan. 30, 2025, 11 Pages.

* cited by examiner

*Primary Examiner* — Umar Cheema
(74) *Attorney, Agent, or Firm* — Duft & Bornsen, PC

(57) ABSTRACT

In some embodiments, there may be provided a method that includes receiving, as a first input to a first machine learning model, at least a first traffic matrix indicative of an amount of traffic routed among at least one node pair of an overlay network; receiving, as a second input to the first machine learning model, information indicative of overlay network routing among the at least one node pair of the overlay network; receiving, as a third input to the first machine learning model, measured delay between the at least one node pair of the overlay network; and learning, by the first machine learning model, a representation of an underlay network, the learning using a minimization of a difference between an average delay in the underlay network and the measured delay between the at least one node pair of the overlay network.

20 Claims, 12 Drawing Sheets

175A
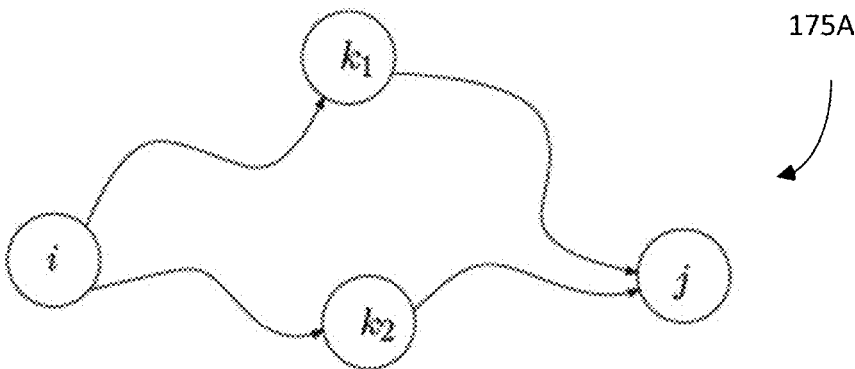
175B
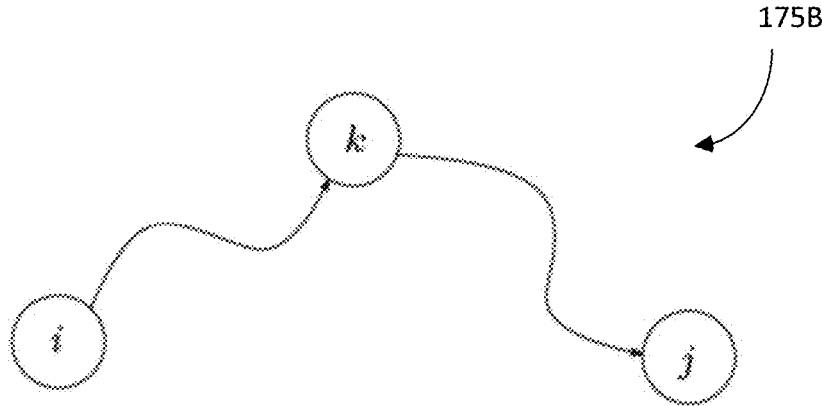
FIG. 1E

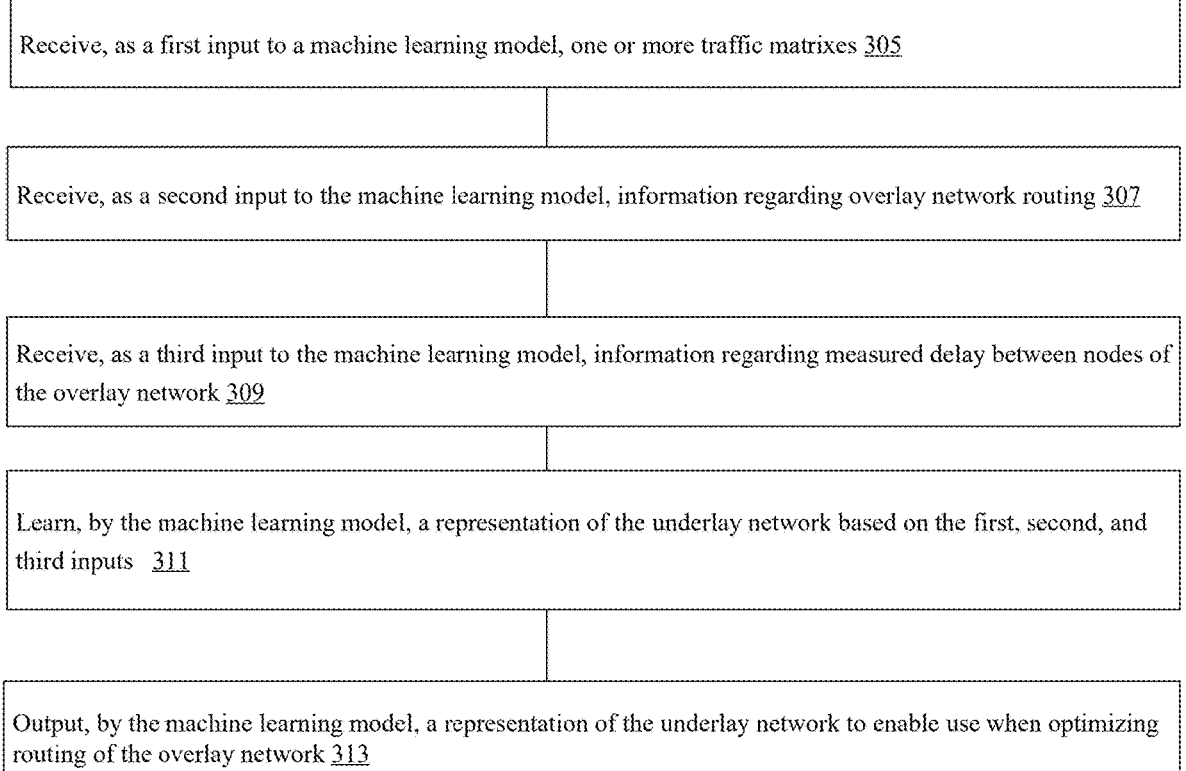

Receive, as a first input to a machine learning model, one or more traffic matrixes 305

Receive, as a second input to the machine learning model, information regarding overlay network routing 307

Receive, as a third input to the machine learning model, information regarding measured delay between nodes of the overlay network 309

Learn, by the machine learning model, a representation of the underlay network based on the first, second, and third inputs   311

Output, by the machine learning model, a representation of the underlay network to enable use when optimizing routing of the overlay network 313

FIG. 3A

Figure 3B:
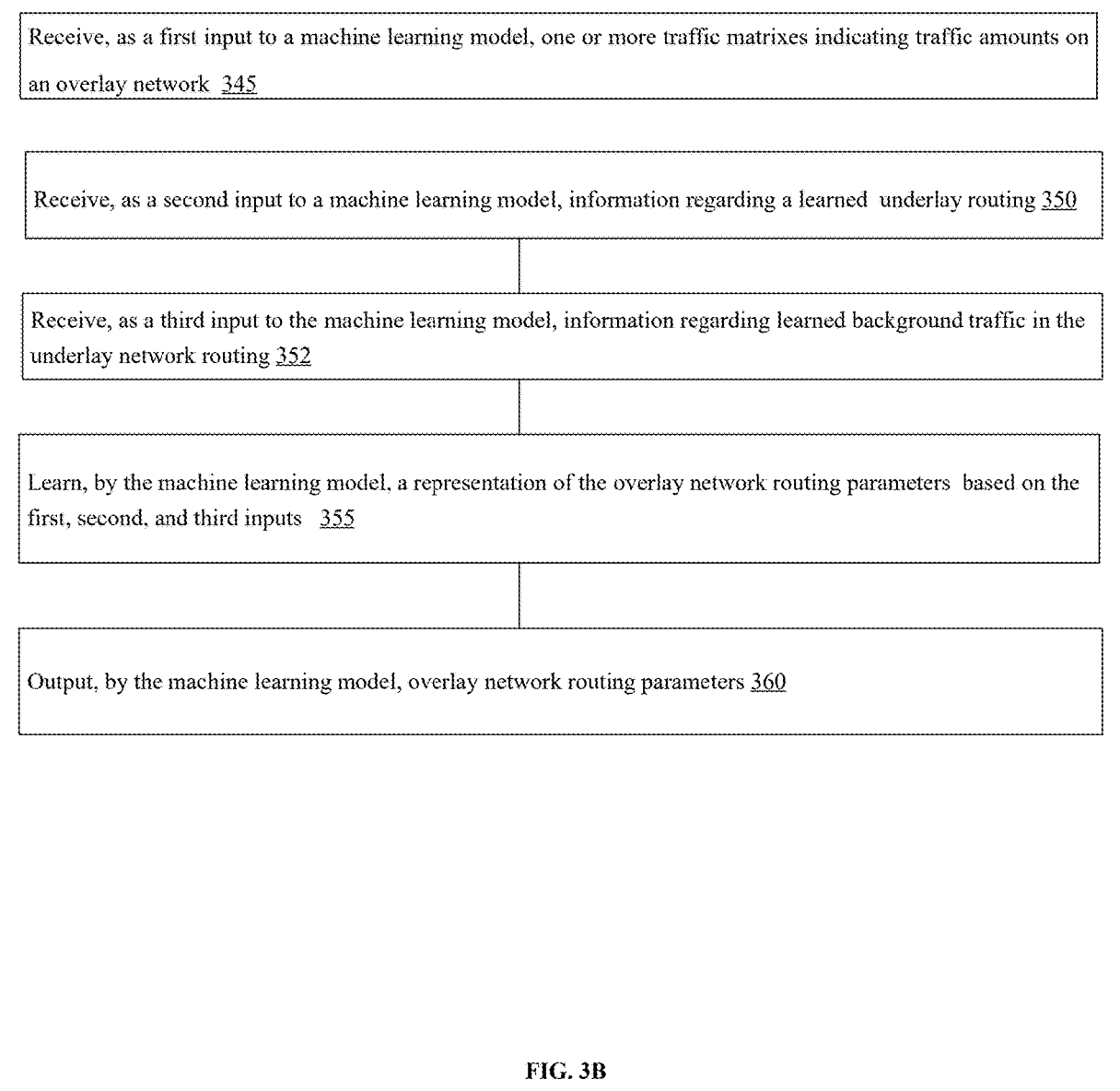

Receive, as a first input to a machine learning model, one or more traffic matrixes indicating traffic amounts on an overlay network  345

Receive, as a second input to a machine learning model, information regarding a learned  underlay routing 350

Receive, as a third input to the machine learning model, information regarding learned background traffic in the underlay network routing 352

Learn, by the machine learning model, a representation of the overlay network routing parameters  based on the first, second, and third inputs   355

Output, by the machine learning model, overlay network routing parameters 360

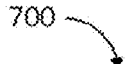
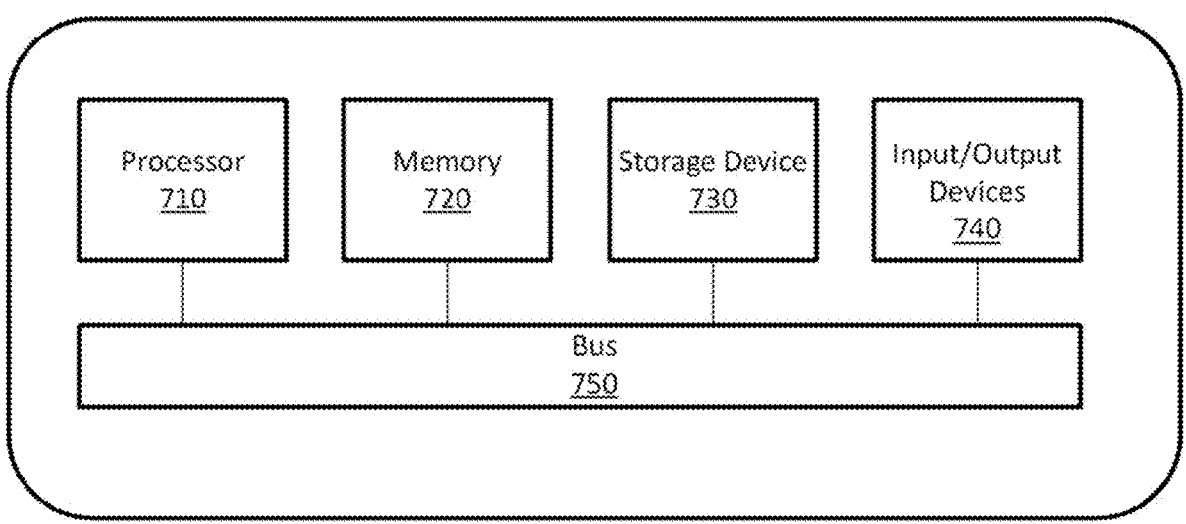
FIG. 6

OPAQUE ROUTING ON OVERLAY NETWORKS: A STRUCTURED NEURAL NET BASED APPROACH

FIELD

The subject matter described herein relates to networking and machine learning.

BACKGROUND

Machine learning (ML) models may learn via training. The ML model may take a variety of forms, such as an artificial neural network (or neural network, for short), decision trees, and/or the like. The training of the ML model may be supervised (with labeled training data), semi-supervised, or unsupervised. When trained, the ML model may be used to perform an inference task.

SUMMARY

In some embodiments, there may be provided a method that includes receiving, as a first input to a first machine learning model, at least a first traffic matrix indicative of an amount of traffic routed among at least one node pair of an overlay network; receiving, as a second input to the first machine learning model, information indicative of overlay network routing among the at least one node pair of the overlay network; receiving, as a third input to the first machine learning model, measured delay between the at least one node pair of the overlay network; learning, by the first machine learning model, a representation of an underlay network, the learning using a minimization of a difference between an average delay in the underlay network and the measured delay between the at least one node pair of the overlay network; and outputting, by the first machine learning model, the representation of the underlay network.

In some variations, one or more of the features disclosed herein including the following features can optionally be included in any feasible combination. The learning may further include learning, by the first machine learning model, a representation of background traffic in the underlay network, the learning of the representation of the background traffic in the underlay network using the minimization of the difference between the average delay in the underlay network and the measured delay between the at least one node pair of the overlay network. The output may further include outputting the representation of the background traffic in the underlay network. A second machine model may learn one or more routing parameters for the overlay network, the learning using at least the representation of the underlay network and/or a representation of background traffic in the underlay network. A second machine learning model may receive, as a first input to the second machine learning model, at least a second traffic matrix for the overlay network. The second machine learning model may receive, as a second input to the second machine learning model, the representation of the underlay network. The second machine learning model may receive, as a third input to the second machine learning model, a representation of background traffic in the underlay network. The second machine learning model may learn a representation of one or more routing parameters for the overlay network by minimizing a mean delay over node pairs of the overlay network. The second machine learning model may output the representation of the one or more routing for the overlay network to enable configuring routing in the overlay network. The second machine learning model may include an input layer to receive the second traffic matrix for the overlay network, the representation of the underlay network, and the representation of background traffic in the underlay network, an intermediate layer to determine one or more intermediate values for one or more segment flows, one or more link flows, one or more link delays, and one or more computed delays, and an output layer to output the representation of the one or more routing parameters for the overlay network to enable configuring routing in the overlay network. The first machine learning model may include an input layer to receive the first input, the second input, and the third input, an intermediate layer to determine one or more intermediate values for one or more segment flows, one or more link delays, and one or more computed delays, and an output layer to output the representation of the underlay network.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIG. 1E depicts an example of split segment routing and un-split segment routing, in accordance with some embodiments;

FIG. 3A depicts an example of a process for training a ML model so that the ML model learns a representation of an opaque underlay network, in accordance with some embodiments;

FIG. 3B depicts an example of a process for optimizing routing of an overlay network using a ML model, in accordance with some embodiments;

FIG. 6 depicts an example of a computing system, in accordance with some embodiments.

Figure 1A:
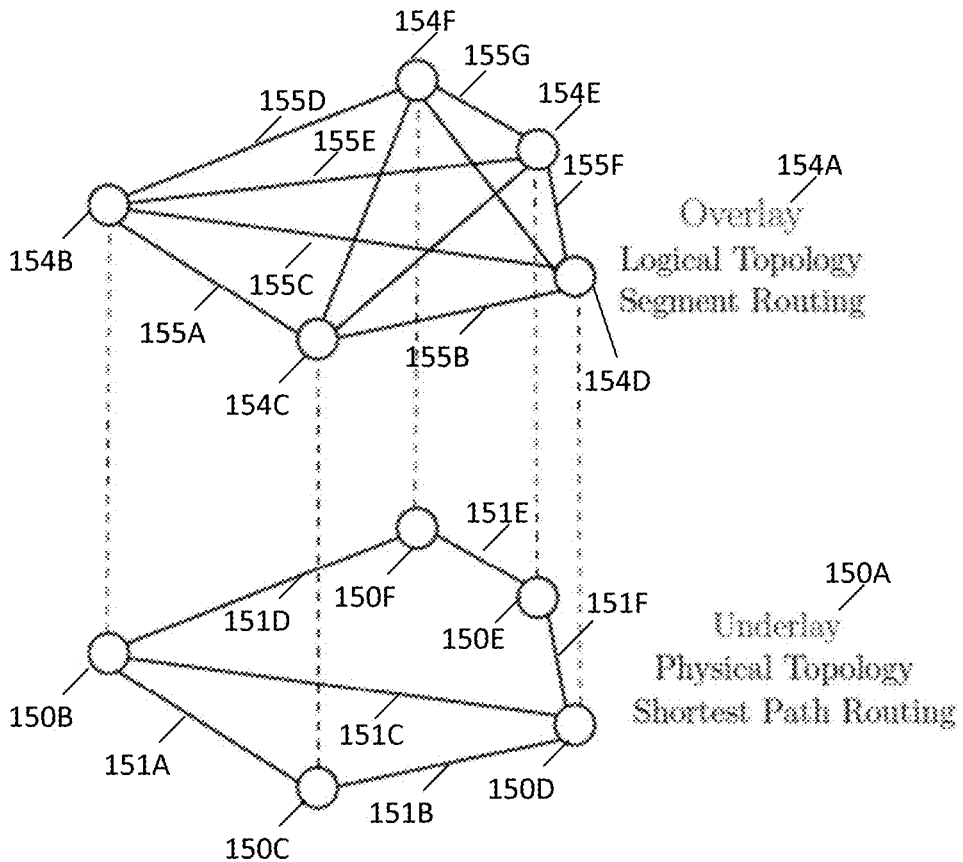
FIG. 1A illustrates an example of an overlay network layered on an underlay network, in accordance with some embodiments.

Like labels are used to refer to same or similar items in the drawings.

DETAILED DESCRIPTION

FIG. 1A illustrates an underlay network 150A and an overlay network 154A layered on the underlay network 150A. The underlay network may include a plurality of nodes 150B-F coupled by one or more links 151A-F and may use for example shortest path routing to route data, such as packets, between the underlay network's nodes. And, the overlay network may include a plurality of nodes 154B-F coupled by one or more segments 155A-G (each of which may include one or more underlay links), and segment routing may be used among the nodes. For example, the underlay network may correspond to a physical network coupled by physical links through which data are routed using shortest path routing, and the overlay network may correspond to a virtual private network layered on the physical underlay network.

In the example of FIG. 1A, a user of the overlay network 154A may be able to control routing using for example segment routing between the nodes 154B-F, but the user of the overlay network may have little if any insight into the underlay network 150A. In other words, from the perspective of the overlay network, the underlay network is "opaque" with respect to underlay network details such as topology, routing being used, actual performance of the underlay nodes, actual performance of the underlay links, and/or other network information about the physical underlay network. For example, a service provider will not typically allow a user of the overlay network, such as a VPN, to access information about the network service provider's physical network providing the underlay network 150A. Nor will the service provider typically allow the user of the overlay network to control routing or configuration of the underlay network. To illustrate further, supposing a user of the overlay network seeks to re-route traffic to improve performance or avoid a node of the overlay network by re-routing traffic between node 154B and node 154F. Although the overlay network user may not be able to control routing in the underlay network, this user may, however, configure routing via segments in the overlay routing. But as the underlay network is opaque, the user does not have any information into any effect(s) this change in the overlay network might have on the underlay network. For example, this re-routing may (or may not) provide the performance improvement expected or desired by the user.

Figure 1B:
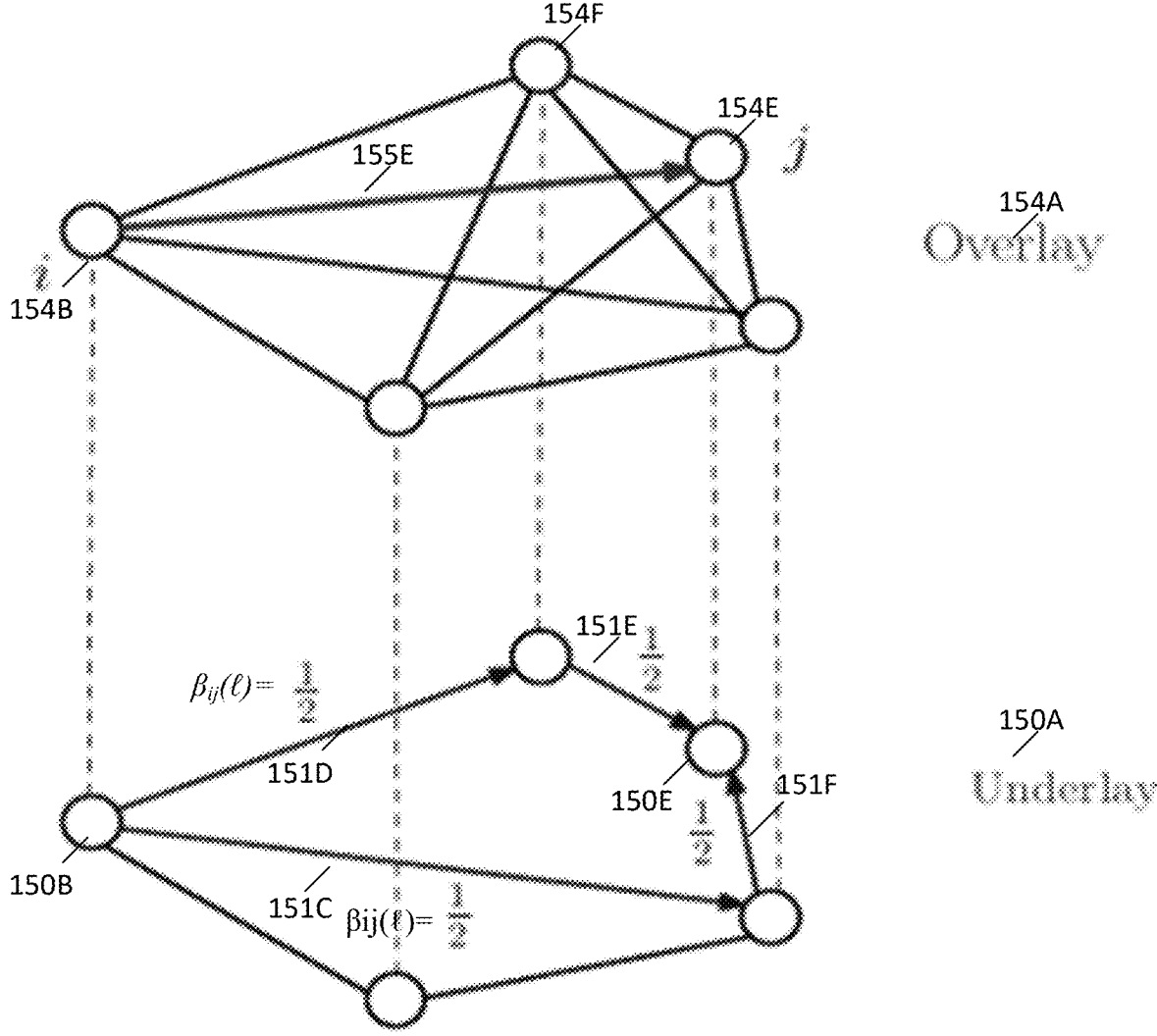
FIG. 1B illustrates how traffic in an underlay network maps to traffic in an overlay network, in accordance with some embodiments.

FIG. 1B depicts the underlay network 150A and overlay network 154A of FIG. 1A, but further shows how data traffic in the underlay network maps to the overlay network. In the example of FIG. 1B, traffic in the overlay network between node i 154B and node j 154E are routed over a segment 155E, in which case the traffic may be routed via the underlay network via one or more physical links such as links 151D and 151E and links 151C and link 151F. The traffic in the underlay network is denoted by $\beta_{ij}(\ell)$, wherein $\beta_{ij}(\ell)$ denotes the fractional amount of traffic on a physical link $\ell$ when a unit flow is sent between nodes i and j (e.g., via segment 155E) in the overlay. In the example of FIG. 1B, traffic leaving node 150B is split such that half the traffic traverses links 151D and 151E and the other half traverses links 151C and link 151F. In this example, links 151D and 151E each have a $\beta_{ij}(\ell)=\frac{1}{2}$ and the links 151C and 151F each have a $\beta_{ij}(\ell)=\frac{1}{2}$. In other words, $\beta_{ij}(\ell)$ indicates the fractional amount of traffic from source node i to destination node j that is routed on a given link $\ell$.

In the overlay network 154A, the amount of traffic (also referred to traffic demand) routed between node i 154B and node j 154E in the overlay network at time t is denoted by $d_{ij}(t)$. This overlay traffic can be routed from nodes i to j along multiple hops on the overlay using segment routing, such as Single Deflection Segment Routing (SDSR) and the like. As noted, this overlay routing results in traffic in the links of the underlay network, and the corresponding delay of each link in the underlay is a function of at least the link's utilization (although the user of the overlay network will not have access to the actual delays of the physical links of the underlay network as it is opaque). The fraction of traffic sent from node i to node j deflected through an intermediate node k (e.g., node 154F) on the overlay network may be denoted by $$x_{ij}^k$$

as follows:

$$\sum_k x_{ij}^k(t) = 1 \ \forall\, i, j, t. \qquad \text{Equation 1.}$$

In the underlay network 150A, the background traffic on a given link $\ell$ in the underlay network may be denoted by $\lambda(\ell)$. And, the background traffic $\lambda(\ell)$ may be considered independent of any traffic generated by the overlay network. For example, the background traffic $\lambda(\ell)$ may be other traffic being carried by the underlay network that is not associated with the overlay network 154A.

As the underlay network is opaque to the user(s) of the overlay network, a user of the overlay network 154A may not have information regarding the underlay network 150A, but this overlay network user may still measure delay between any two nodes of the overlay network. For example, the delay between nodes i 154B and node j 154E (as well as other node pairs of the overlay network) may be measured by sending packets with a time stamp (e.g., using a ping or other type of probe) over the link or segment 155E. The delay may be in terms of time, such as milliseconds, and the delay may represent an average delay, in which case multiple delay measurements between nodes are performed and then averaged.

In some embodiments, there is provided a way to route on an overlay network, such as a virtual private network, without having information about an "opaque" underlay network's topology and/or routing. For example, traffic may be routed on the overlay network (without knowledge of the underlay topology and/or routing) and one or more delays between node pairs of the overlay network may be measured. Next, a machine learning model may be used to learn how to model (e.g., represent) the underlay network's topology and/or routing, and this learning may be based at least on the one or more measured delays between node pairs of the overlay network. When the machine learning (ML) model is trained, the machine learning model may provide as an output a representation of the underlay network's topology and/or routing. This ML model output may comprise the underlay network's routing parameter $\beta_{ij}(\ell)$. This output may then be used by a ML model to determine how to optimally route traffic on the overlay network.

Before providing additional details regarding the ML model based learning of the underlay network topology and routing and optimizing routing on the overlay network, the following provides additional details regarding segment routing on the overlay network, delay, underlay network routing (e.g., βij($\ell$)), and the ML model's objective function using delays.

Figure 1C:
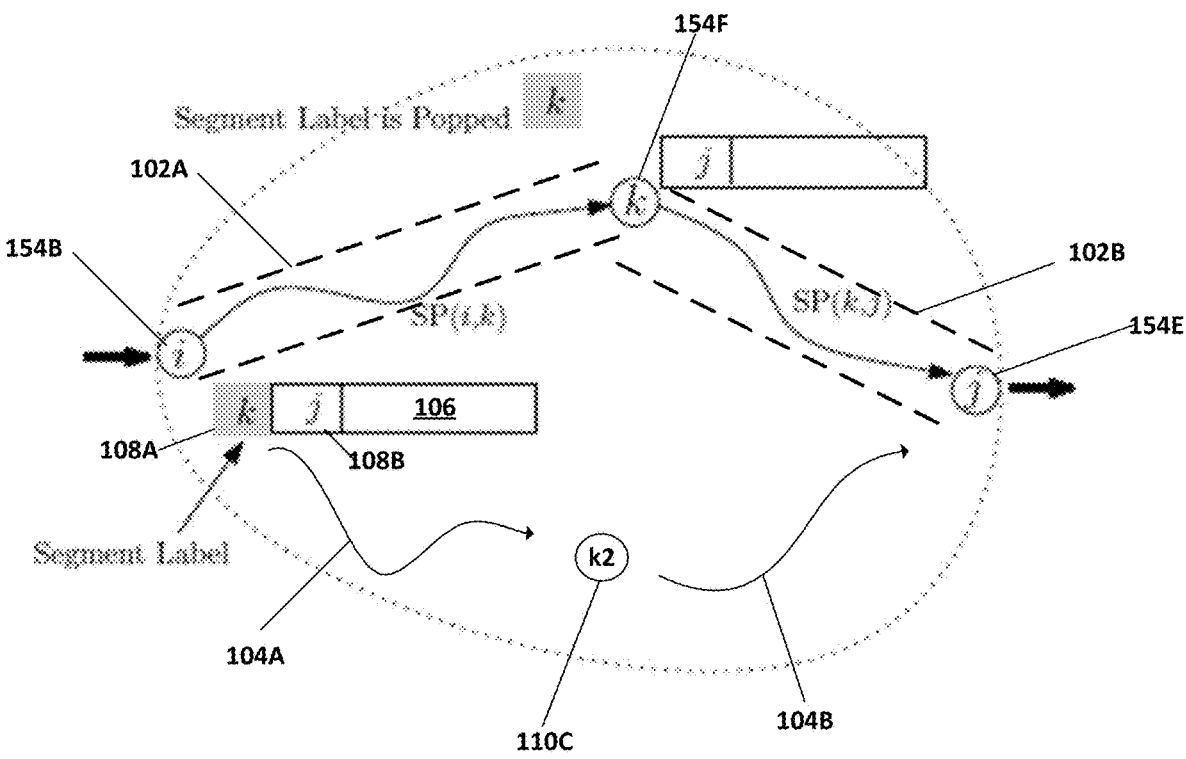
FIG. 1C depicts an example of segment routing between two nodes i and j of the overlay network, in accordance with some embodiments.

FIG. 1C depicts an example of segment routing between two nodes i and j of the overlay network using segments. In the example of FIG. 1C, there is a first segment 102A between node i 154B and node k 154F and a second segment 102B between node k 154F and node j 154E (wherein node k may be referred to as an intermediate or a deflection node). Within a given segment such as segment 102A or 102B of the overlay network, shortest path routing may be used to determine one or more physical links $\ell$ (e.g., in the underlay network) used to carry physically the traffic, such as the packet 106, in the underlay network. Formally, a segment may represent a minimum weight path between a pair of nodes. For example, the segment between nodes i and j may be a minimum weight path between nodes i and j, wherein the minimum weight path is computed using a link metric.

Referring to the packet 106 at FIG. 1C, the packet includes a segment label "k" 108A and a destination address 'j' 108B. The segment label specifies to node i 154B that packet 106 is to be forwarded to destination node j 154E over the segments 102A-B using for example segment based routing but deflected via intermediate node k 154F, while the physical links (within the segments) and associated link metrics may selected using a shortest path algorithm through the links of the segments 102A-B. Within each of the segments for example, shortest path routing may be used to determine the path through the physical links of the underlay network to carry the packet 106 to intermediate node k 154F.

Figure 1D:
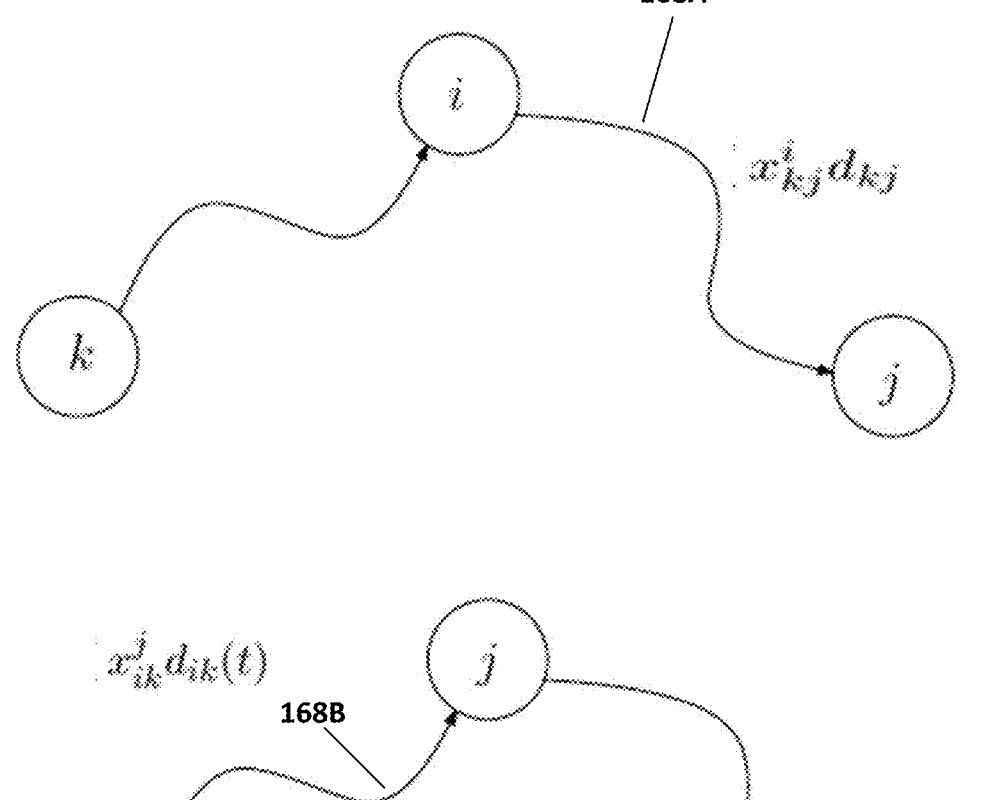
FIG. 1D depicts an example of a 2-hop segment, in accordance with some embodiments.

To illustrate further by way of a numerical example, the flow of traffic through any given segment ("segment traffic flow") between nodes i and j may be represented as follows:

$$\phi_{ij}(t) = \sum_k x_{kj}^i d_{kj}(t) + \sum_k x_{ik}^j d_{ik}(t), \qquad \text{Equation 2}$$

wherein the segment's traffic flow is $\phi_{ij}$ and is the total amount of traffic flow over a segment between node i and node j, the deflection parameters are $$x_{kj}^i \text{ and } x_{ik}^j,$$

and $d_{kj}(t)$ and $d_{ik}(t)$ are indicative of an amount of traffic demand (which is obtained from a traffic matrix, for example). In other words, the amount of traffic flow (which is between nodes nodes i and j) that is deflected via node k is a function of the deflection parameters and the amount of traffic flow over the segment. For example, a deflection parameter of 0.75 for $$x_{ij}^k,$$

given a traffic demand of 10 Gigabyte between nodes i and node j, the amount of traffic flow over the segment via node k would be 7.5 Gigabytes. With respect to Equation 2, the amount of traffic flow over the segment is computed for a segment between nodes i and j, and this traffic flow takes into account that the segment might be a second hop of a two hop segment 168A and a first hop 168B of a two hop segment as shown in FIG. 1D.

The flow on link $\ell$ in the underlay network due to unit flow on the segment between node i and node j in the overlay may be denoted by $\beta_{ij}(\ell)$ and the background traffic on link $\ell$ is denoted by $\lambda(\ell)$. The background traffic in the underlay traffic is independent of the traffic in the overlay network segments. The total amount of flow F ($\ell$, t) on a given link $\ell$ at time t may be represented by $$F(\ell, t) = \sum_i \sum_j \beta_{ij}(\ell)\phi_{ij}(t) + \lambda(\ell) \qquad \text{Equation 3}$$
$$= \sum_i \sum_j \beta_{ij}(\ell)\left[\sum_k x_{kj}^i(t) + \sum_k x_{kj}^j(t)d_{ik}(t)\right].$$
$$+ \lambda(\ell)$$

As noted, the delay in a link ("link delay") is an increasing function of the link's utilization. As such, the delay of $\delta(\ell$, t) on a link $\ell$ at time t may be represented as follows:

$$\delta(\ell, t) = D\left(\frac{F(\ell, t)}{c(\ell)}\right), \qquad \text{Equation 4}$$

wherein c($\ell$) is the capacity of the link $\ell$.

With respect to average delay between nodes of the overlay network, the average delay between node i and node j of the overlay network is a function of the average delay on the path between node i and node j on the underlay network. The average delay on the path between node i and node j at time t in the underlay network may be denoted as $\overline{\Delta}_{ij}$ and represented by the following:

$$\overline{\Delta}_{ij}(t) = \sum_k x_{kj}^j(t)\left[\sum_\ell \beta_{ik}(\ell)\delta(\ell, t) + \sum_\ell \beta_{kj}(\ell)\delta(\ell, t)\right]. \qquad \text{Equation 5}$$

The average delay $\overline{\Delta}_{ij}$ may be measured between some if not all of the nodes pairs of the overlay network.

The underlay network routing may be indicated by the βij($\ell$) values as these values encapsulate information about the underlay topology and routing. To train the ML model, learning may use as an objective (or loss) function to determine the βij($\ell$) values that minimize a difference between the average delay $\overline{\Delta}_{ij}(t)$ (which is not known to the overlay as the underlay network is opaque) and the measured delay in the overlay network $\omega_{ij}(t)$ using for example the following:

$$(\overline{\Delta}_{ij}(t) - \omega_{ij}(t))^2. \qquad \text{Equation 6}$$

Figure 2A:
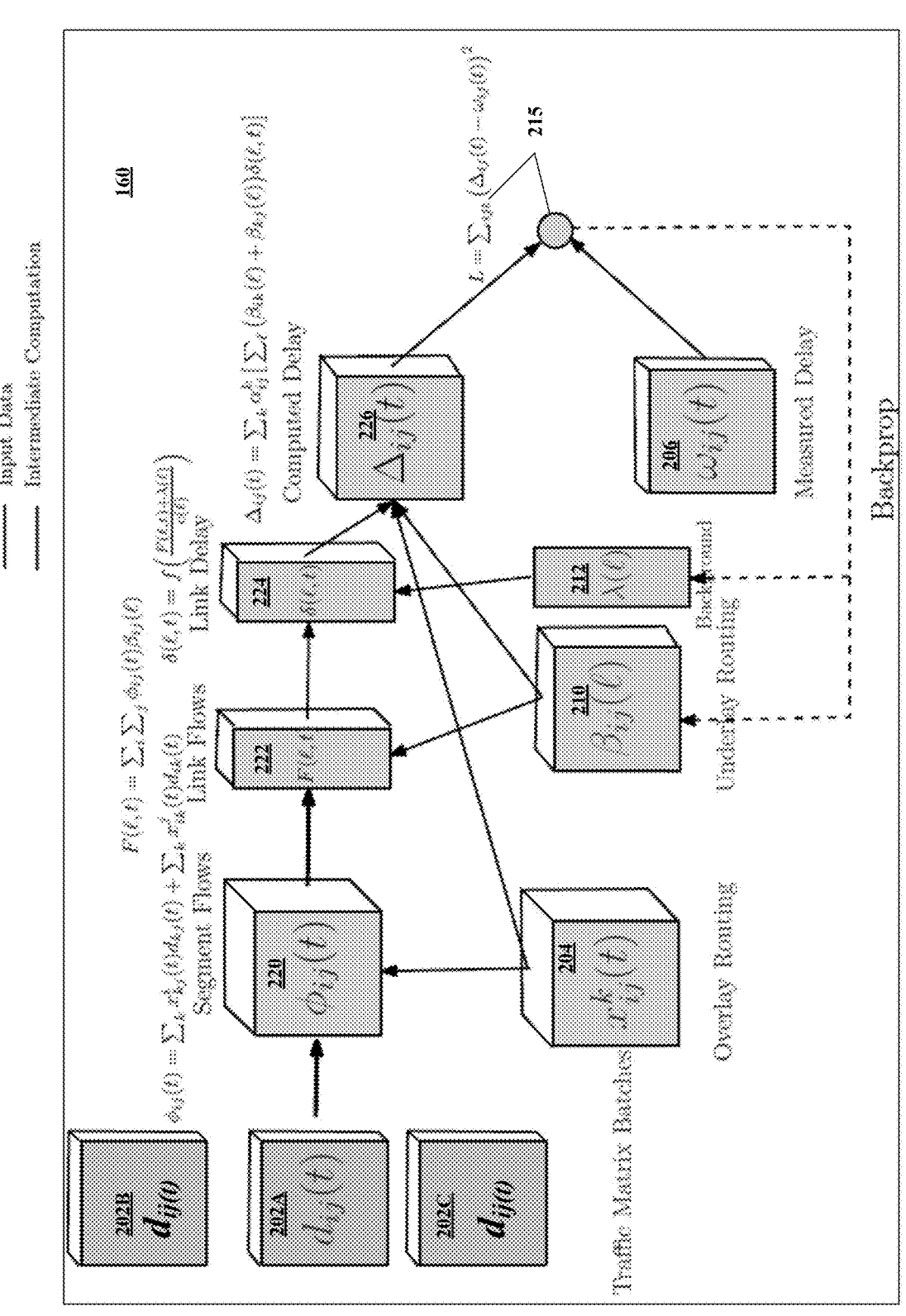
FIG. 2A depicts an example of training a machine learning (ML) model that is configured to learn, based on at least measured delay over the overlay network, a representation of the underlay network, in accordance with some embodiments.

For example, the machine learning model (e.g., using a PyTorch framework) may learn using the noted objective function (using stochastic gradient descent as explained further with respect to FIG. 2A) to determine a model (e.g., representation) of the underlay network without having information regarding the underlay network.

FIG. 2A depicts an example of a machine learning model 160 for learning a representation of an underlay network without having knowledge about the underlay network's topology and/or routing. The ML model (which in this example is a neural network) is trained using traffic matrices and corresponding measured delays over the node pairs of the overlay network. In an example training session of the ML model, a total number of training samples of about 100 is used and training is done batches of 10 picked at random from the 100 training samples (although other training set sizes and batch sizes may be used as well).

In the ML model 160, the decision variables in the learning of the ML model are the underlay network routing $\beta_{ij}(\ell)$ parameters 210 and the background traffic $\lambda(\ell)$ parameters 212. At each step during ML model training, a subset of the traffic matrices and their corresponding overlay delays are fed into the ML model. The ML model adjusts the decision variables $\beta_{ij}(\ell)$ and $\lambda(\ell)$ based on an objective function (which attempts to converge to a minimum difference between the computed and observed delays noted above with respect to Equation 6 and shown at 215).

At 202A-C, the ML model 160 may receive, as an input, one or more traffic matrixes, in accordance with some embodiments. For example, the traffic matrix 202A may indicate an amount of traffic routed between any two nodes, such as nodes i and j, in the overlay network 154A at time t. As noted, the amount of traffic between nodes i and j in the overlay network 154A may be denoted by $d_{ij}(t)$. The traffic matrix 202A may include the amount of traffic between nodes pairs of the overlay network 154. In the example of FIG. 1A where there are 5 nodes, the traffic matrix includes 25 values for the $d_{ij}(t)$ node pairs.

At 204, the ML model 160 may receive, as an input, information regarding the overlay routing, in accordance with some embodiments. For example, the ML model may receive values for the segment routing parameters, such as the deflection parameters $$x_{ij}^k,$$

which indicates the topology and routing used on the overlay network.

At 206, the ML model 160 may receive, as an input, information regarding measured delay between nodes of the overlay network, in accordance with some embodiments. For example, the ML model may measure delay between pairs of nodes i and j of the overlay network. Referring to overlay network 154A of FIG. 1A for example, the ML model may receive 25 measured delay values ($\omega_{ij}(t)$) for the 5 nodes of the overlay network for a corresponding traffic matrix $d_{ij}(t)$.

Given the inputs at 202A-C, 204, and 206, the ML model 160 may learn the underlay network's routing 210 (e.g., underlay network routing $\beta_{ij}(\ell)$ parameters) and/or background traffic 212 (e.g., background traffic $\lambda(\ell)$ parameters) that minimizes at 215 a difference between the average delay $\hat{\Delta}_{ij}(t)$ values (which are not known as the underlay network and its links are opaque to the overlay network) and the measured delay $\omega_{ij}(t)$ values (which are measured over the overlay network) using for example Equation 6 above. For example, the decision variables, such as $\beta_{ij}(\ell)$ parameters 210 and the background traffic $\lambda(\ell)$ parameters 212, may be varied using backpropagation until the objective function converges to a minimum difference between the computed and observed delays at 215.

As shown at FIG. 2A, the ML model 160 computes as part of learning intermediate values for the segment flows 220 (see, e.g., $\phi_{ij}$ at Equation 2), link flows 222 (see, e.g., F ($\ell$, t) at Equation 3), link delay 224 (see, e.g., $\delta(\ell, t)$ at Equation 4), and computed delay 226 (see, e.g., $\hat{\Delta}_{ij}(t)$ at Equation 5). These intermediate values are used to determine the difference values at 215.

In the example of FIG. 2A, the machine learning model 160 has a structure that includes an input layer (of, for example, one or more compute nodes) configured to receive the first input, the second input, and the third input (e.g., inputs 202A-C, 204, and 206). The machine learning model may further include an intermediate layer (of, for example, one or more compute nodes) configured to determine one or more intermediate values for one or more segment flows, one or more link delays, and one or more computed delays (e.g., 220, 222, 224, and 226). The machine learning model may further include an output layer (of, for example, one or more compute nodes) configured to output the representation of the underlay network (e.g., 210).

When the ML model converges and minimizes the difference at 215 between the computed average delay $\hat{\Delta}_{ij}(t)$ and the measured delay $\omega_{ij}(t)$ across the traffic matrixes 202A-C and the measured delay 206 values, the underlay routing $\beta_{ij}(\ell)$ 210 parameters (e.g., values) serve as a model or representation of the underlay network. In other words, the underlay routing $\beta_{ij}(\ell)$ values provides a representation of the underlay topology and its routing. The $\beta_{ij}(\ell)$ values may, as noted, model the underlay network's topology and routing, and the $\beta_{ij}(\ell)$ values may (or may not) indicate actual routing values used in the opaque underlay network. Moreover, as the underlay network is opaque, the quantity of nodes in the underlay may not be known, so the ML model may use an initial quantity and proceed with the learning of $\beta_{ij}(\ell)$.

Once the underlay topology is learned using the underlay routing parameters $\beta_{ij}(\ell)$ 210, this underlay information may be used to optimize traffic routing on the overlay (e.g., such that the routing minimizes average delay). For example, given $d_{ij}$ denotes the traffic matrix that has to be routed over the overlay network and $\hat{\beta}_{ij}(\ell)$ and $\hat{\lambda}(\ell)$ denote the $\beta_{ij}(\ell)$ 210 and $\lambda(\ell)$ 212 values learned by the ML model 160, the decision variables are $$x_{ij}^k,$$

which denotes overlay routing parameters, such as the fraction of traffic from nodes i to j that is deflected through node k with the constraint, $$\sum_k x_{ij}^k = 1. \qquad\qquad \text{Equation 7}$$

This constraint may be reformulated as an unconstrained optimization for the ML model. For $$x_{ik}^k$$

for example, $$y_{ik}^k$$

may be defined such that $$x_{ij}^k \propto e^{\alpha y_{ij}^k},$$

wherein $\alpha>0$ is a fixed constant, so the constraint of Equation 7 implies $$x_{ij}^k = \frac{e^{\alpha y_{ij}^k}}{\sum_k e^{\alpha y_{ij}^k}},$$

Equation 8 wherein any $$y_{ik}^k, x_{ik}^k \geq 0.$$

This transformation ensures $$x_{ij}^k \geq 0 \text{ and } \sum_k x_{ij}^k = 1$$

are satisfied. With this reformulation, the flow on link $\ell$ in the underlay network is represented by the following:

$$F(\ell) = \sum_i \sum_j \hat{\beta}_{ij}(\ell) \left[ \sum_k \frac{e^{\alpha y_{kj}^j}}{\sum_p e^{\alpha y_{kj}^p}} d_{kj} + \sum_k \frac{e^{\alpha y_{ik}^j}}{\sum_p e^{\alpha y_{ik}^p}} d_{ik} \right] \hat{\lambda}(\ell).$$

Equation 9

The delay on link $\ell$ in the underlay may be denoted as follows:

$$\delta(\ell) = D\left(\frac{F(\ell)}{c(\ell)}\right).$$

Equation 10

And, the average delay between nodes i and j in the overlay may be denoted as follows.

$$\Delta_{ij} = \sum_k \frac{e^{\alpha y_{ij}^k}}{\sum_p e^{\alpha y_{ij}^p}} \left[ \sum_\ell \hat{\beta}_{ik}(\ell)\delta(\ell) + \sum_\ell \hat{\beta}_{kj}(\ell)\delta(\ell) \right].$$

Equation 11

The overall optimization problem of minimizing the average delay may be represented as follows:

$$\min_{y_{ij}^k} \sum_{ij} d_{ij} \sum_k \frac{e^{\alpha y_{ij}^k}}{\sum_p e^{\alpha y_{ij}^p}} \left[ \sum_\ell \hat{\beta}_{ik}(\ell)\delta(\ell) + \sum_\ell \hat{\beta}_{kj}(\ell)\delta(\ell) \right].$$

Equation 12

The variables $\hat{\beta}ij(\ell)$ and $\hat{\lambda}(\ell)$ are estimated from the ML learning using for example, a PyTorch machine learning framework.

Figure 2B:
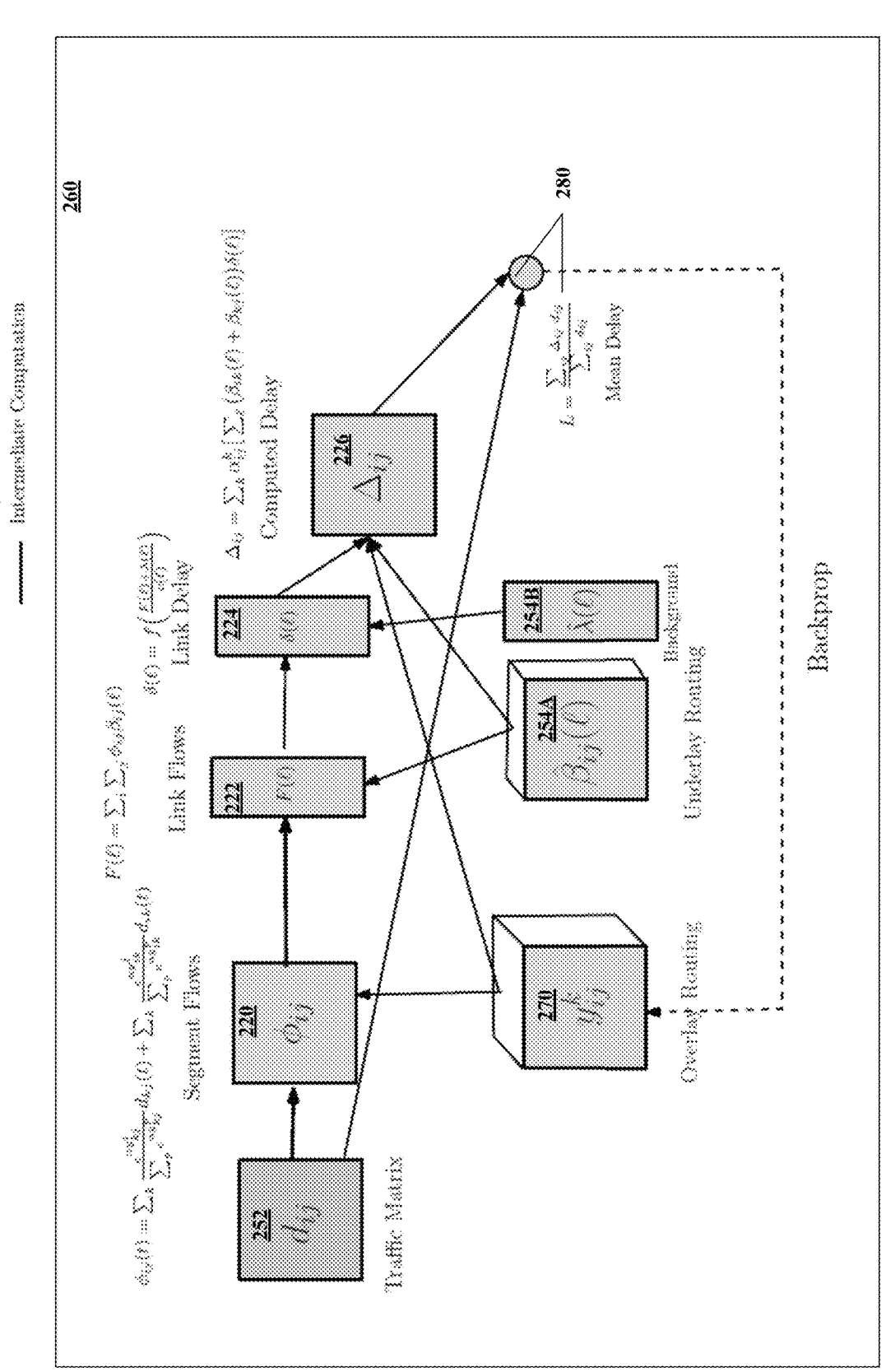
FIG. 2B depicts an example of a trained machine learning (ML) model being used to optimize routing in the overlay network when there is an opaque underlay network, in accordance with some embodiments.

FIG. 2B depicts another example of a ML model 260 used to optimize traffic in an overlay network when the underlay network is opaque such that the overlay network (or its user) has no knowledge regarding at least the topology and/or routing of the underlay network, in accordance with some embodiments.

At 252, the ML model 260 may receive, as an input, at least one traffic matrix, in accordance with some embodiments. For example, the traffic matrix 252 may indicate an amount of traffic routed between any two nodes, such as nodes i and j, in the overlay network 154A at time t.

At 254A, the ML model 260 may receive, as an input, information regarding the underlay routing, in accordance with some embodiments. For example, the ML model may receive the underlay network routing $\beta_{ij}(\ell)$ parameters learned at FIG. 2A; the learned underlay network routing parameters are denoted as $\hat{\beta}ij(\ell)$.

At 254B, the ML model 260 may receive, as an input, information regarding the background traffic in the underlay network, in accordance with some embodiments. For example, the ML model may receive the background traffic $\lambda(\ell)$ parameters learned at FIG. 2A and denoted as learned background traffic $\hat{\lambda}(\ell)$.

Given the inputs at 252, 254A, and 254B, the ML model 260 may learn the overlay network's routing 270 parameters (e.g., $$y_{ij}^k$$

values) that minimizes at 280 the objective function, which corresponds to mean delay. At 280, the computed delay $\Delta_{ij}$ is averaged based on the amount of traffic $d_{ij}$. For example, the overlay network's routing 270 parameters (e.g., $$y_{ij}^k$$

values) may be varied using backpropagation until the objective function converges to a minimum difference between the computed and observed delays at 280.

As shown at FIG. 2B, the ML model 260 computes as part of learning intermediate values for the segment flows 220 (see, e.g., $\phi_{ij}$ at Equation 2), link flows 222 (see, e.g., F ( $\ell$, t) at Equation 3), link delay 224 (see, e.g., $\delta(\ell$, t) at Equation 4), and computed delay 226 (see, e.g., $\Delta_{ij}$(t) at Equation 5). When the ML model 260 converges by finding a minimum for the mean delay at 280, the optimal overlay routing $$y_{ij}^k$$

270 parameters may be used as an output to configure segment routing on the overlay network.

In the example of FIG. 2B, the machine learning model 260 has a structure that includes an input layer (of, for example, one or more compute nodes) configured to receive the second traffic matrix for the overlay network, the representation of the underlay network, and the representation of background traffic in the underlay network (e.g., 252 and 254A-B). The machine leaning model may further include an intermediate layer (of, for example, one or more compute nodes) configured to determine one or more intermediate values for one or more segment flows, one or more link flows, one or more link delays, and one or more computed delays (e.g., 220, 222, 224, and 226). And, the machine learning model may further include an output layer (of, for example, one or more compute nodes) configured to output the representation of the one or more routing parameters (e.g., 270) for the overlay network to enable configuring routing in the overlay network.

In some implementations, an un-split SDSR routing scheme may be derived from the split routing overlay parameters provided at 270. In the case of split routing, traffic from source node i to destination node j is split among multiple deflection points, such as node $k_1$ and $k_2$ as shown at 175A of FIG. 1E. At 175A, part of traffic from source node i to destination node j is deflected through $k_1$ and the rest through node $k_2$. In the case of un-split SDSR, the traffic from source node i to destination node j is deflected through a single deflection node k as shown at 175B. As shown at 175B, with un-split SDSR all traffic from source i to destination j is deflected through a single node k.

To derive the un-split SDSR from the split SDSR, a corresponding $$x_{ij}^k$$

is determined as follows:

$$x_{ij}^k = \frac{e^{\alpha y_{ij}^k}}{\sum_p e^{\alpha y_{ij}^p}},$$

Equation 13.

And, randomized rounding is performed. For example, for each ij pair, one k is picked by for example rolling a so-called n sided die where the probability of getting k is $$x_{ij}^k.$$

Since $$\sum_k x_{ij}^k = 1,$$

there is a valid probability distribution. Next, $$z_{ij}^{k*} = 1$$

if and only if there k* is obtained when the dies is rolled for ij. After all the ij are rounded, the resulting $$z_{ij}^k$$

represents an unsplit SDSR. This process of rounding can be repeated multiple times and the solution that results in the lowest maximum link utilization can be picked.

FIG. 3A depicts an example of a process for training of a ML model so that the ML model learns a representation of an opaque underlay network, in accordance with some embodiments.

At 305, a ML model may receive, as a first input, one or more traffic matrixes, in accordance with some embodiments. For example, a traffic matrix 202A may be received, and this traffic matrix may indicate an amount of traffic routed between any two node in the overlay network, such as overlay network 154A at a given time t.

At 307, the ML model may receive, as a second input, information regarding overlay network routing, in accordance with some embodiments. For example, the second input may include values for the segment routing parameters $$x_{ij}^k$$

that indicate the topology and routing used on the overlay network.

At 309, the ML model may receive, as a third input, information regarding measured delay between nodes of the overlay network, in accordance with some embodiments. For example, the ML model 160 may receive 25 measured delay values $(\omega_{ij}(t))$ for the 5 nodes of the overlay network 154A for a corresponding traffic matrix $d_{ij}(t)$.

At 311, the ML model may learn a representation of the underlay network, in accordance with some embodiments. For example, given the inputs 305-309, the ML model 160 may learn the underlay network's routing parameters $\beta_{ij}(\ell)$ that minimize a difference between the average delay $\overline{\Delta}_{ij}(t)$ values (which are not known as the underlay network is opaque) and the measured delay $\omega_{ij}(t)$ values as noted at 215 above (see, also Equation 6 above). Alternatively, or additionally, given the inputs 305-309, the ML model 160 may learn the underlay network's background traffic $\lambda(\ell)$ parameters that minimize a difference between the average delay $\overline{\Delta}_{ij}(t)$ values and the measured delay $\omega_{ij}(t)$ values.

When the ML model converges and minimizes the difference between the computed average delay $\overline{\Delta}_{ij}(t)$ and the measured delay in the underlay $\omega_{ij}(t)$, the machine learning model 160 may output at 313 the representation of the underlay network, such as the underlay routing $\beta_{ij}(\ell)$ parameters 210. Alternatively, or additionally, the ML model 160 may output the background traffic $\lambda(\ell)$ parameters 212. The representation of the underlay network (e.g., underlay routing $\beta_{ij}(\ell)$ parameters 210) and/or background traffic (e.g., background traffic $\lambda(\ell)$ parameters 212) may be output to enable use when optimizing routing of the overlay network.

FIG. 3B depicts an example of a process for optimizing routing of an overlay network using a ML model, in accordance with some embodiments.

At 345, a ML model, such as ML model 260, may receive, as a first input, one or more traffic matrixes, in accordance with some embodiments. For example, the first input may include at least one traffic matrix that indicates an amount of traffic routed between any two node in the overlay network, such as overlay network 154A, at a given time t.

At 350, a ML model, such as ML model 260, may receive, as a second input, information regarding the underlay routing learned by a ML model, such as ML model 160, in accordance with some embodiments. For example, the first input may include the learned underlay network routing $\beta\hat{}ij(\ell)$ provided at 210 as an output of the ML model 160 of FIG. 2A.

At 352, a ML model, such as ML model 260, may receive, as a third input, information regarding learned background traffic in the underlay network, in accordance with some embodiments. For example, second input may include the learned background traffic $\lambda\hat{}(\ell)$ provided at 212 as an output of the ML model 160 of FIG. 2A.

Given the inputs at 345-352, the ML model 260 may learn, at 355, the overlay network's routing 270 parameters (e.g., $$y_{ij}^k$$

values 270) that minimize an objective function. For example, the ML model 260 may minimize the mean delay as noted at 280.

When the ML model 260 converges and minimizes mean delay 280, the machine learning model 260 may output at 360 the overlay network's routing 270 parameters. The overlay network's routing 270 parameters may be use to configure segment routing on the overlay network.

Figure 4:
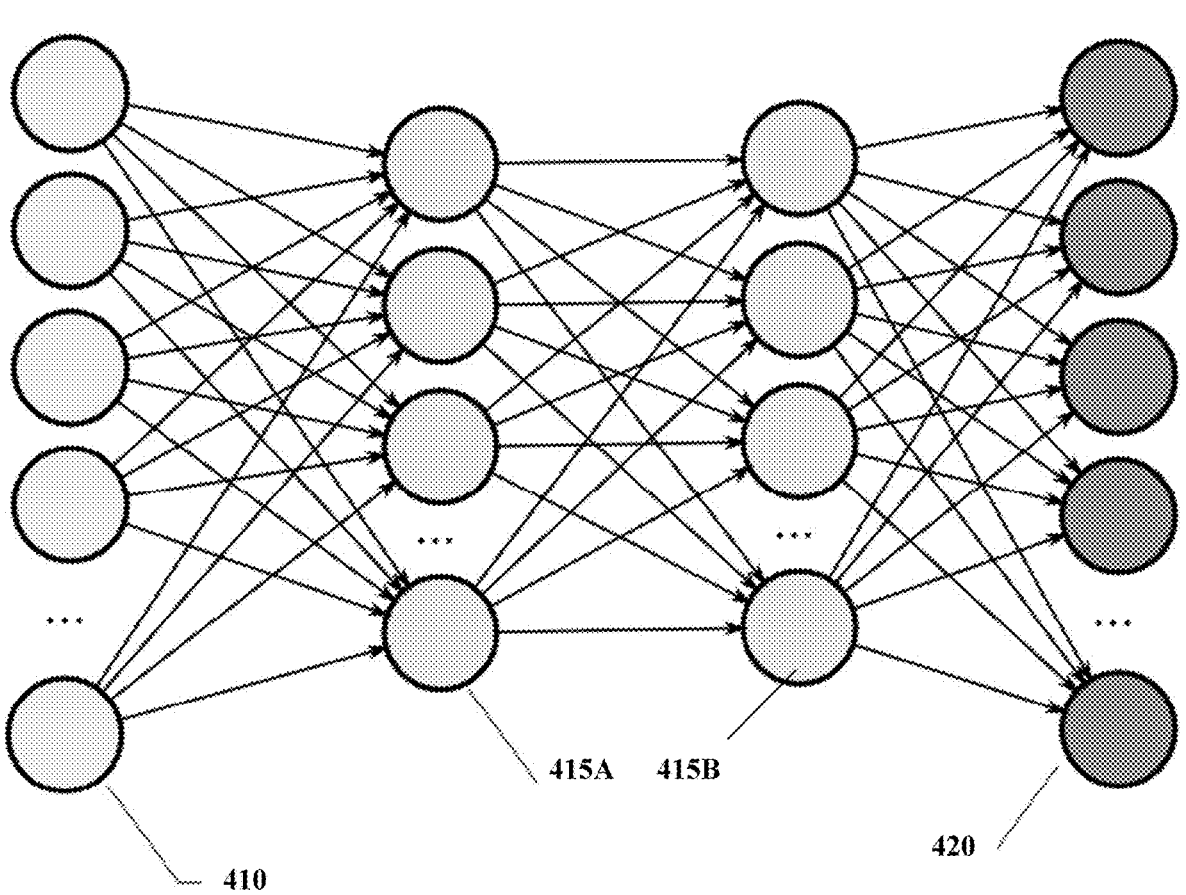
FIG. 4 depicts an example of a ML model, in accordance with some embodiments.

FIG. 4 depicts an example of a ML model 400, in accordance with some embodiments. The ML model 400 may be used as the ML model 160. The input layer 410 may include a node for each node in the network. The ML model may include one or more hidden layers 415A-B (also referred to as intermediate layers) and an output layer 420. The machine learning model 400 may be comprised in a network node, a user equipment, and/or other computer-based system. Alternatively, or additionally, the ML model may be provided as a service, such as a cloud service (accessible at a computing system such as a server via a network such as the Internet or other type of network).

Figure 5:
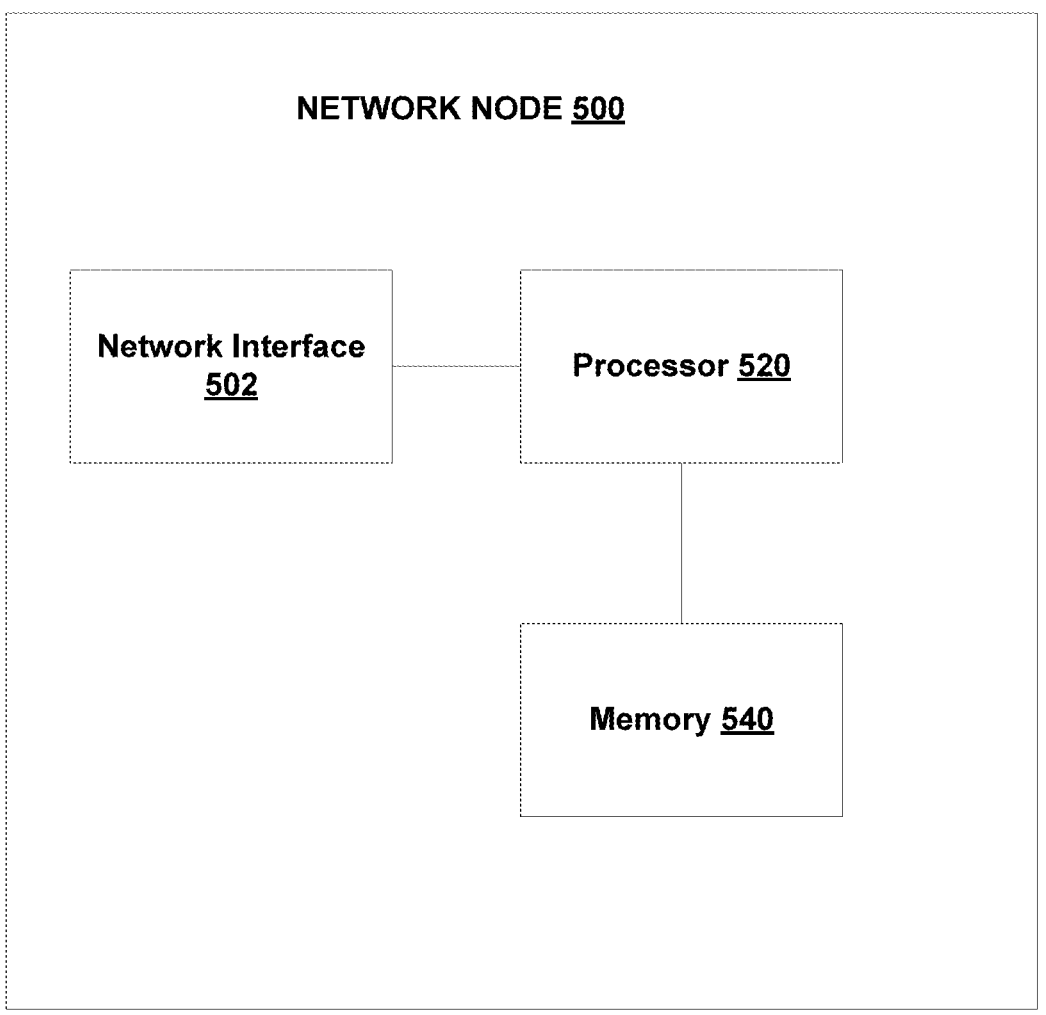
FIG. 5 depicts an example of a network node, in accordance with some embodiments.

FIG. 5 depicts a block diagram of a network node 500, in accordance with some embodiments. As noted, the machine learning model 160 or 260 may be comprised in a network node. The network node 500 may comprise or be comprised in one or more network side nodes or functions. The network node 500 may include a network interface 502, a processor 520, and a memory 540, in accordance with some embodiments. The network interface 502 may include wired and/or wireless transceivers to enable access other nodes including base stations, other network nodes, the Internet, other networks, and/or other nodes. The memory 540 may comprise volatile and/or non-volatile memory including program code, which when executed by at least one processor 520 provides, among other things, the processes disclosed herein. For example, a network node such as a network management system may include the ML model 160 and/or 260 to learn the underlay network routing parameters and to optimize overlay routing when the underlay network is opaque.

FIG. 6 depicts a block diagram illustrating a computing system 700, in accordance with some embodiments. For example, the network management system 150 and/or ML model 160 (or 400) may be comprised the system 700. As shown in FIG. 6, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. In some implementations of the current subject matter, the processor 710 can be a single-threaded processor. Alternately, the processor 710 can be a multi-threaded processor. The process may be a multi-core processor have a plurality or processors or a single core processor. Alternatively, or additionally, the processor 710 can be a graphics processor unit (GPU), an AI chip, and/or the like. The processor 710 is capable of processing instructions stored in the memory 720 and/or on the storage device 730 to display graphical information for a user interface provided via the input/output device 740. The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces. According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

Without in any way limiting the scope, interpretation, or application of the claims appearing below, a technical effect of one or more of the example embodiments disclosed herein may include enhanced optimization of networks, so networks can more efficiently route traffic on overlay networks without having knowledge of the underlay network's topology and/or routing.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1: A method comprising: receiving, as a first input to a first machine learning model, at least a first traffic matrix indicative of an amount of traffic routed among at least one node pair of an overlay network; receiving, as a second input to the first machine learning model, information indicative of overlay network routing among the at least one node pair of the overlay network; receiving, as a third input to the first machine learning model, measured delay between the at least one node pair of the overlay network; learning, by the first machine learning model, a representation of an underlay network, the learning using a minimization of a difference between an average delay in the underlay network and the measured delay between the at least one node pair of the overlay network; and outputting, by the first machine learning model, the representation of the underlay network Example 2: The method of Example 1, wherein the learning further comprises: learning, by the first machine learning model, a representation of background traffic in the underlay network, the learning of the representation of the background traffic in the underlay network using the minimization of the difference between the average delay in the underlay network and the measured delay between the at least one node pair of the overlay network.

Example 3: The method of any of Examples 1-2, wherein the outputting further comprises outputting the representation of the background traffic in the underlay network.

Example 4: The method of any of Examples 1-3 further comprising: learning, by a second machine model, one or more routing parameters for the overlay network, the learning using at least the representation of the underlay network and/or a representation of background traffic in the underlay network.

Example 5: The method of any of Examples 1-4 further comprising: receiving, as a first input to a second machine learning model, at least a second traffic matrix for the overlay network.

Example 6: The method of any of Examples 1-5 further comprising: receiving, as a second input to the second machine learning model, the representation of the underlay network.

Example 7: The method of any of Examples 1-6 further comprising: receiving, as a third input to the second machine learning model, a representation of background traffic in the underlay network.

Example 8: The method of any of Examples 1-7 further comprising: learning, by the second machine learning model, a representation of one or more routing parameters for the overlay network by minimizing a mean delay over node pairs of the overlay network.

Example 9: The method of any of Examples 1-8 further comprising: outputting, by the second machine learning model, the representation of the one or more routing for the overlay network to enable configuring routing in the overlay network.

Example 10: The method of any of Examples 1-10, wherein the second machine learning model includes an input layer to receive the second traffic matrix for the overlay network, the representation of the underlay network, and the representation of background traffic in the underlay network, an intermediate layer to determine one or more intermediate values for one or more segment flows, one or more link flows, one or more link delays, and one or more computed delays, and an output layer to output the representation of the one or more routing parameters for the overlay network to enable configuring routing in the overlay network.

Example 11: The method of any of Examples 1-11, wherein the first machine learning model includes an input layer to receive the first input, the second input, and the third input, an intermediate layer to determine one or more intermediate values for one or more segment flows, one or more link delays, and one or more computed delays, and an output layer to output the representation of the underlay network.

Example 12: An apparatus comprising: at least one processor; and at least one memory including instructions, which when execute by the at least one processor causes operations comprising: receiving, as a first input to a first machine learning model, at least a first traffic matrix indicative of an amount of traffic routed among at least one node pair of an overlay network; receiving, as a second input to the first machine learning model, information indicative of overlay network routing among the at least one node pair of the overlay network; receiving, as a third input to the first machine learning model, measured delay between the at least one node pair of the overlay network; learning, by the first machine learning model, a representation of an underlay network, the learning using a minimization of a difference between an average delay in the underlay network and the measured delay between the at least one node pair of the overlay network; and outputting, by the first machine learning model, the representation of the underlay network Example 13: The apparatus of Example 12, wherein the learning further comprises: learning, by the first machine learning model, a representation of background traffic in the underlay network, the learning of the representation of the background traffic in the underlay network using the minimization of the difference between the average delay in the underlay network and the measured delay between the at least one node pair of the overlay network.

Example 14: The apparatus of any of Examples 12-13, wherein the outputting further comprises outputting the representation of the background traffic in the underlay network.

Example 15: The apparatus of any of Examples 12-14 further comprising: learning, by a second machine model, one or more routing parameters for the overlay network, the learning using at least the representation of the underlay network and/or a representation of background traffic in the underlay network.

Example 16: The apparatus of any of Examples 12-15 further comprising: receiving, as a first input to a second machine learning model, at least a second traffic matrix for the overlay network.

Example 17: The apparatus of any of Examples 12-16 further comprising: receiving, as a second input to the second machine learning model, the representation of the underlay network.

Example 18: The apparatus of any of Examples 12-17 further comprising: receiving, as a third input to the second machine learning model, a representation of background traffic in the underlay network.

Example 19: The apparatus of any of Examples 12-18 further comprising: learning, by the second machine learning model, a representation of one or more routing parameters for the overlay network by minimizing a mean delay over node pairs of the overlay network.

Example 20: The apparatus of any of Examples 12-19 further comprising: outputting, by the second machine learning model, the representation of the one or more routing for the overlay network to enable configuring routing in the overlay network.

Example 21: The apparatus of any of Examples 12-20, wherein the second machine learning model includes an input layer to receive the second traffic matrix for the overlay network, the representation of the underlay network, and the representation of background traffic in the underlay network, an intermediate layer to determine one or more intermediate values for one or more segment flows, one or more link flows, one or more link delays, and one or more computed delays, and an output layer to output the representation of the one or more routing parameters for the overlay network to enable configuring routing in the overlay network.

Example 22: The apparatus of any of Examples 12-21, wherein the first machine learning model includes an input layer to receive the first input, the second input, and the third input, an intermediate layer to determine one or more intermediate values for one or more segment flows, one or more link delays, and one or more computed delays, and an output layer to output the representation of the underlay network.

Example 23: A non-transitory computer readable storage medium including instructions, which when execute by at least one processor causes operations comprising: receiving, as a first input to a first machine learning model, at least a first traffic matrix indicative of an amount of traffic routed among at least one node pair of an overlay network; receiving, as a second input to the first machine learning model, information indicative of overlay network routing among the at least one node pair of the overlay network; receiving, as a third input to the first machine learning model, measured delay between the at least one node pair of the overlay network; learning, by the first machine learning model, a representation of an underlay network, the learning using a minimization of a difference between an average delay in the underlay network and the measured delay between the at least one node pair of the overlay network; and outputting, by the first machine learning model, the representation of the underlay network.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
receiving, as a first input to a first machine learning model, at least a first traffic matrix indicative of an amount of traffic routed among node pairs of an overlay network layered on an underlay network;
receiving, as a second input to the first machine learning model, information indicative of overlay network routing among the node pairs of the overlay network;
receiving, as a third input to the first machine learning model, measured delay between the node pairs of the overlay network;
learning, by the first machine learning model, a representation of the underlay network, the learning using a minimization of a difference between an average delay between node pairs of the underlay network and the measured delay between the node pairs of the overlay network, wherein the average delay between the node pairs of the underlay network is a function of the average delay between the node pairs of the overlay network; and
outputting, by the first machine learning model, the representation of the underlay network;
wherein decision variables in the learning of the first machine learning model comprise parameters of the underlay network, and the learning comprises varying the parameters until the difference converges to a minimum difference.

2. The method of claim 1, wherein:
the parameters comprise background traffic in the underlay network.

3. The method of claim 1, wherein:
the parameters comprise underlay network routing in the underlay network.

4. The method of claim 1 further comprising:
learning, by a second machine learning model, one or more routing parameters for the overlay network, the learning using at least one of a representation of underlay network routing in the underlay network or a representation of background traffic in the underlay network.

5. The method of claim 1 further comprising:
receiving, as a first input to a second machine learning model, at least a second traffic matrix for the overlay network.

6. The method of claim 5 further comprising:
receiving, as a second input to the second machine learning model, a representation of underlay network routing in the underlay network.

7. The method of claim 6 further comprising:
receiving, as a third input to the second machine learning model, a representation of background traffic in the underlay network.

8. The method of claim 7 further comprising:
learning, by the second machine learning model, a representation of one or more routing parameters for the overlay network by minimizing a mean delay over the node pairs of the overlay network.

9. The method of claim 8 further comprising:
outputting, by the second machine learning model, the representation of the one or more routing parameters for the overlay network to enable configuring routing in the overlay network.

10. The method of claim 8, wherein the second machine learning model includes an input layer to receive the second traffic matrix for the overlay network, the representation of the underlay network routing in the underlay network, and the representation of the background traffic in the underlay network, an intermediate layer to determine one or more intermediate values for one or more segment flows, one or more link flows, one or more link delays, and one or more computed delays, and an output layer to output the representation of the one or more routing parameters for the overlay network to enable configuring routing in the overlay network.

11. The method of claim 1, wherein the first machine learning model includes an input layer to receive the first input, the second input, and the third input, an intermediate layer to determine one or more intermediate values for one or more segment flows, one or more link delays, and one or more computed delays, and an output layer to output the representation of the underlay network.

12. An apparatus comprising:

at least one processor; and at least one memory including instructions, which when executed by the at least one processor causes operations comprising:

receiving, as a first input to a first machine learning model, at least a first traffic matrix indicative of an amount of traffic routed among node pairs of an overlay network layered on an underlay network;

receiving, as a second input to the first machine learning model, information indicative of overlay network routing among the node pairs of the overlay network;

receiving, as a third input to the first machine learning model, measured delay between the node pairs of the overlay network;

learning, by the first machine learning model, a representation of the underlay network, the learning using a minimization of a difference between an average delay between node pairs of the underlay network and the measured delay between the node pairs of the overlay network, wherein the average delay between the node pairs of the underlay network is a function of the average delay between the node pairs of the overlay network; and outputting, by the first machine learning model, the representation of the underlay network;

wherein decision variables in the learning of the first machine learning model comprise parameters of the underlay network, and the learning comprises varying the parameters until the difference converges to a minimum difference.

13. The apparatus of claim 12, wherein:

the parameters comprise background traffic in the underlay network.

14. The apparatus of claim 12, wherein:

the parameters comprise underlay network routing in the underlay network.

15. The apparatus of claim 12, wherein the instructions when executed by the at least one processor causes operations further comprising:

learning, by a second machine learning model, one or more routing parameters for the overlay network, the learning using at least one of a representation of underlay network routing in the underlay network or a representation of background traffic in the underlay network.

16. The apparatus of claim 12, wherein the instructions when executed by the at least one processor causes operations further comprising:

receiving, as a first input to a second machine learning model, at least a second traffic matrix for the overlay network.

17. The apparatus of claim 16, wherein the instructions when executed by the at least one processor causes operations further comprising:

receiving, as a second input to the second machine learning model, a representation of underlay network routing in the underlay network.

18. The apparatus of claim 17, wherein the instructions when executed by the at least one processor causes operations further comprising:

receiving, as a third input to the second machine learning model, a representation of background traffic in the underlay network.

19. The apparatus of claim 18, wherein the instructions when executed by the at least one processor causes operations further comprising:

learning, by the second machine learning model, a representation of one or more routing parameters for the overlay network by minimizing a mean delay over the node pairs of the overlay network; and outputting, by the second machine learning model, the representation of the one or more routing parameters for the overlay network to enable configuring routing in the overlay network.

20. A non-transitory computer readable storage medium including instructions, which when executed by at least one processor causes operations comprising:

receiving, as a first input to a machine learning model, at least a first traffic matrix indicative of an amount of traffic routed among node pairs of an overlay network layered on an underlay network;

receiving, as a second input to the machine learning model, information indicative of overlay network routing among the node pairs of the overlay network;

receiving, as a third input to the machine learning model, measured delay between the node pairs of the overlay network;

learning, by the machine learning model, a representation of the underlay network, the learning using a minimization of a difference between an average delay between node pairs of the underlay network and the measured delay between the node pairs of the overlay network, wherein the average delay between the node pairs of the underlay network is a function of the average delay between the node pairs of the overlay network; and outputting, by the machine learning model, the representation of the underlay network;

wherein decision variables in the learning of the machine learning model comprise parameters of the underlay network, and the learning comprises varying the parameters until the difference converges to a minimum difference.

* * * * *